United States Patent
Barber et al.

(10) Patent No.: US 11,157,307 B2
(45) Date of Patent: Oct. 26, 2021

(54) COUNT AND TRANSACTION IDENTIFIER BASED TRANSACTION PROCESSING

(71) Applicant: INTERNATIONAL BUSINESS MACHINES CORPORATION, Armonk, NY (US)

(72) Inventors: Ronald Jason Barber, San Jose, CA (US); Chandrasekaran Mohan, Saratoga, CA (US); Vijayshankar Raman, Sunnyvale, CA (US); Richard Sefton Sidle, Ottawa (CA); Pinar Tozun, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 754 days.

(21) Appl. No.: 15/603,812

(22) Filed: May 24, 2017

(65) Prior Publication Data

US 2018/0341515 A1    Nov. 29, 2018

(51) Int. Cl.
   *G06F 9/46* (2006.01)
   *G06F 16/903* (2019.01)
(52) U.S. Cl.
   CPC ........ *G06F 9/466* (2013.01); *G06F 16/90335* (2019.01)
(58) Field of Classification Search
   None
   See application file for complete search history.

(56) References Cited

U.S. PATENT DOCUMENTS

| | | | | |
|---|---|---|---|---|
| 6,128,509 | A * | 10/2000 | Veijola | H04M 1/72527 455/403 |
| 6,446,086 | B1 * | 9/2002 | Bartlett | G06F 16/2358 |
| 2004/0205152 | A1 * | 10/2004 | Yasuda | G06F 16/184 709/217 |
| 2005/0177557 | A1 * | 8/2005 | Ziauddin | G06F 16/217 |

(Continued)

FOREIGN PATENT DOCUMENTS

WO     20160120722    8/2016

OTHER PUBLICATIONS

Mohan at el., "Transaction management in the R* distributed database management system", ACM Transactions on Database Systems (TODS), vol. 11 Issue 4, Dec. 1986, pp. 378-396.

(Continued)

*Primary Examiner* — Christopher J Raab
(74) *Attorney, Agent, or Firm* — Anthony Curro; Otterstedt, Wallace & Kammer, LLP (57) ABSTRACT

A computer-implemented method for processing a transaction may include, upon receiving a transaction change request, operating a coordinator to generate a unique transaction identifier for the transaction request, send a data change request along with the unique transaction identifier to sources, and store the unique transaction identifier along with a respective first change count in a transaction status table. The method may also include, upon receiving a query, operating a given source to determine from the transaction status table, a second change count of sources associated with the unique transaction identifier, determine whether the second change count matches the first change count for each (Continued)

source, and when the first and second change counts match in each of the other sources, read data associated with the query from the given source and each source.

15 Claims, 8 Drawing Sheets

(56) References Cited

U.S. PATENT DOCUMENTS

| | | | | |
|---|---|---|---|---|
| 2006/0149794 A1* | 7/2006 | Ylinen | ............... | G06F 16/273 |
| 2006/0184591 A1* | 8/2006 | Backholm | .......... | G06Q 10/1095 |
| 2007/0198518 A1* | 8/2007 | Luchangco | .......... | G06F 16/2315 |
| 2010/0005124 A1* | 1/2010 | Wagner | ................ | G06F 16/27 |
| | | | | 707/E17.005 |
| 2011/0071846 A1 | 3/2011 | Crystal | | |
| 2013/0124425 A1* | 5/2013 | Agrawal | ............... | G06Q 20/42 |
| | | | | 705/75 |
| 2014/0280844 A1* | 9/2014 | Alfia | ..................... | G06F 3/038 |
| | | | | 709/223 |
| 2015/0193346 A1* | 7/2015 | Yamamura | ........... | G06F 9/3834 |
| | | | | 711/144 |
| 2015/0261563 A1 | 9/2015 | Guerin et al. | | |
| 2016/0065498 A1 | 3/2016 | Harper et al. | | |
| 2016/0171002 A1* | 6/2016 | Bendel | ................ | G06F 16/122 |
| | | | | 707/714 |
| 2018/0129693 A1* | 5/2018 | Chatterjee | .......... | G06F 16/2343 |
| 2019/0034477 A1* | 1/2019 | Iyengar | ................ | H04L 67/146 |

OTHER PUBLICATIONS

Mohan et al., "Efficient commit protocols for the tree of processes model of distributed transactions",ACM SIGOPS Operating Systems Review, Apr. 1985, 19(2), pp. 40-52.

Mohan et al., Method for distributed transaction commit and recovery using Byzantine agreement within clusters of processors. In Proceedings of the ACM symposium on Principles of Distributed Computing, pp. 89-103, Montreal, Quebec, Canada, 1983.

Gray et al., Consensus on Transaction Commit, Mircrosoft Research, Jan. 2004.

Lamport, Leslie, The Part-Time Parliament, ACM Transactions on Computer Systems, May 1998, 16 (2): 133-169.

Skeen et al., A Formal Model of Crash Recovery in a Distributed System, May 1983, IEEE Transactions on Software Engineering 9 (3): 219-228.

Keidar et al., Increasing the Resilience of Distributed and Replicated Database Systems, Journal of Computer and System Sciences, Dec. 1998, 57 (3): 309-324.

Barber et al., U.S. Appl. No. 15/603,799, filed May 24, 2017.

* cited by examiner

COUNT AND TRANSACTION IDENTIFIER BASED TRANSACTION PROCESSING

BACKGROUND

The present invention relates to computers, and more specifically, transaction processing. Transaction processing includes processing information that may be divided into several interrelated sub-operations, which are often referred to as transactions. A transaction succeeds when all the sub-operations succeed. However, if any of the sub-operations fail, so does the entire transaction. By processing a transaction as a "whole" rather than processing or treating each sub-operation individually, recovery from an error may be more efficient.

The two-phase commit protocol (2PC) is a technique used in transaction processing that coordinates the processes of a transaction, and particularly, the processes for determining whether to commit or abort the transaction. The 2PC may use state logging or log records. During execution of a transaction, the 2PC includes two phases. A first phase may be referred to as a commit-request phase, in which a coordinator attempts to prepare all the transaction's participating processes for either committing or aborting the transaction and to "vote" to either, commit or abort. A second phase may be referred to as a commit phase where, based on the voting, the coordinator decides whether to commit or abort the transaction, and sends a corresponding notification.

SUMMARY

A computer-implemented method for processing a transaction may include, upon receiving a transaction change request, operating a coordinator to generate a unique transaction identifier for the transaction request, send a data change request along with the unique transaction identifier to a plurality of sources, and store the unique transaction identifier along with a respective first change count in a transaction status table. The method may also include, upon receiving a query, operating a given source to determine from the transaction status table, a second change count for sources associated with the unique transaction identifier, determine whether the second change count matches the first change count for each source, and when the first and second change counts match in each source, read data associated with the query from each source.

Operating the coordinator to send the data change request with the unique transaction identifier may include operating the coordinator to send the data change request with the unique transaction identifier to each of the plurality of sources in parallel. The computer-implemented method may further include operating the coordinator to wait for a status from each of the plurality of sources, for example.

The computer-implemented method may further include, upon receiving the query, operating the given source to not read the data associated with the query when the first and second change counts do not match. The coordinator may be operated to determine whether a threshold time for completing the query has elapsed based upon the first and second change counts not matching, for example.

The computer-implemented method may further include, upon determining whether the unique transaction identifier is in each of the other sources, updating a final outcome, and upon receiving the query, determining whether the final outcome is marked as committed, and when the final outcome is marked as committed, read the data associated with the query from each of the sources, for example. The computer-implemented method may further include, upon receiving the query, operating the plurality of sources to delay determining whether the second change count matches the first change count until a response from each source is received.

Another aspect is directed to a system for processing a transaction. The system may include a processor and a memory coupled thereto. The processor may be configured to, upon receiving a transaction change request, operating a coordinator to generate a unique transaction identifier for the transaction request, send a data change request along with the unique transaction identifier to each of a plurality of sources, and store the unique transaction identifier along with a respective first change count in a transaction status table in the memory. The processor may also be configured to, upon receiving a query, operating a given source to determine from the transaction status table, a second change count of sources associated with the unique transaction identifier, determine whether a second change count for changes associated with the given unique transaction identifier matches the first change count for each source, and when the first and second change counts match in each source, read data associated with the query from the given source and each source.

Another aspect is directed to a computer-readable medium for processing a transaction. The computer-readable medium has computer executable for causing a processor to perform operations that may include, upon receiving a transaction change request, operating a coordinator to generate a unique transaction identifier for the transaction request, send a data change request along with the unique transaction identifier to each of a plurality of sources, and store the unique transaction identifier along with a respective first change count in a transaction status table. The operations may also include, upon receiving a query, operating a given source to determine from the transaction status table, a second change count for sources associated with the unique transaction identifier, determine whether the second change count for changes associated with the given unique transaction identifier matches the first change count for each source, and when the first and second change counts match in each source, read data associated with the query from the given source and each source.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
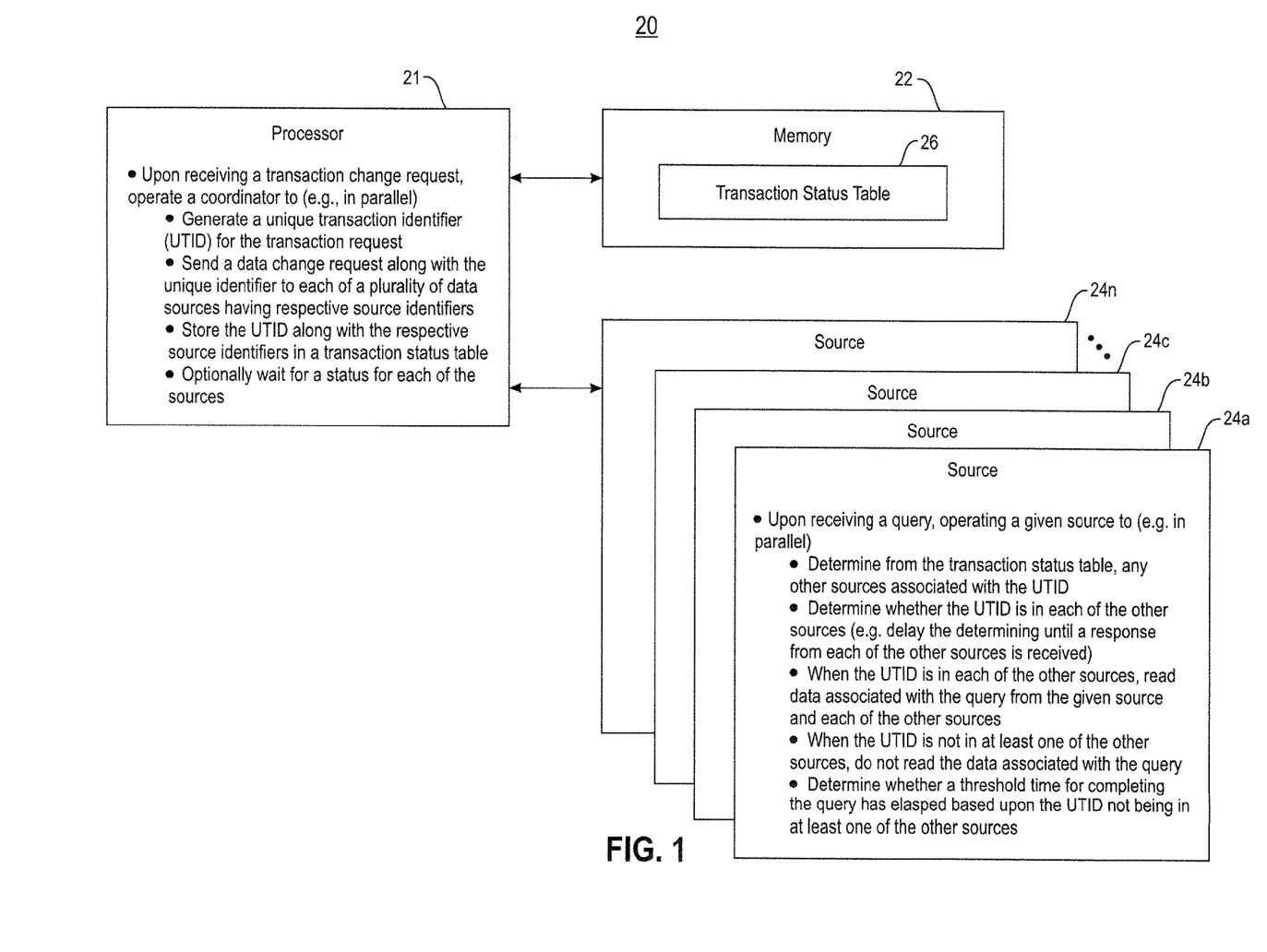
FIG. 1 is a schematic block diagram of a system in accordance with an embodiment.
Figure 2:
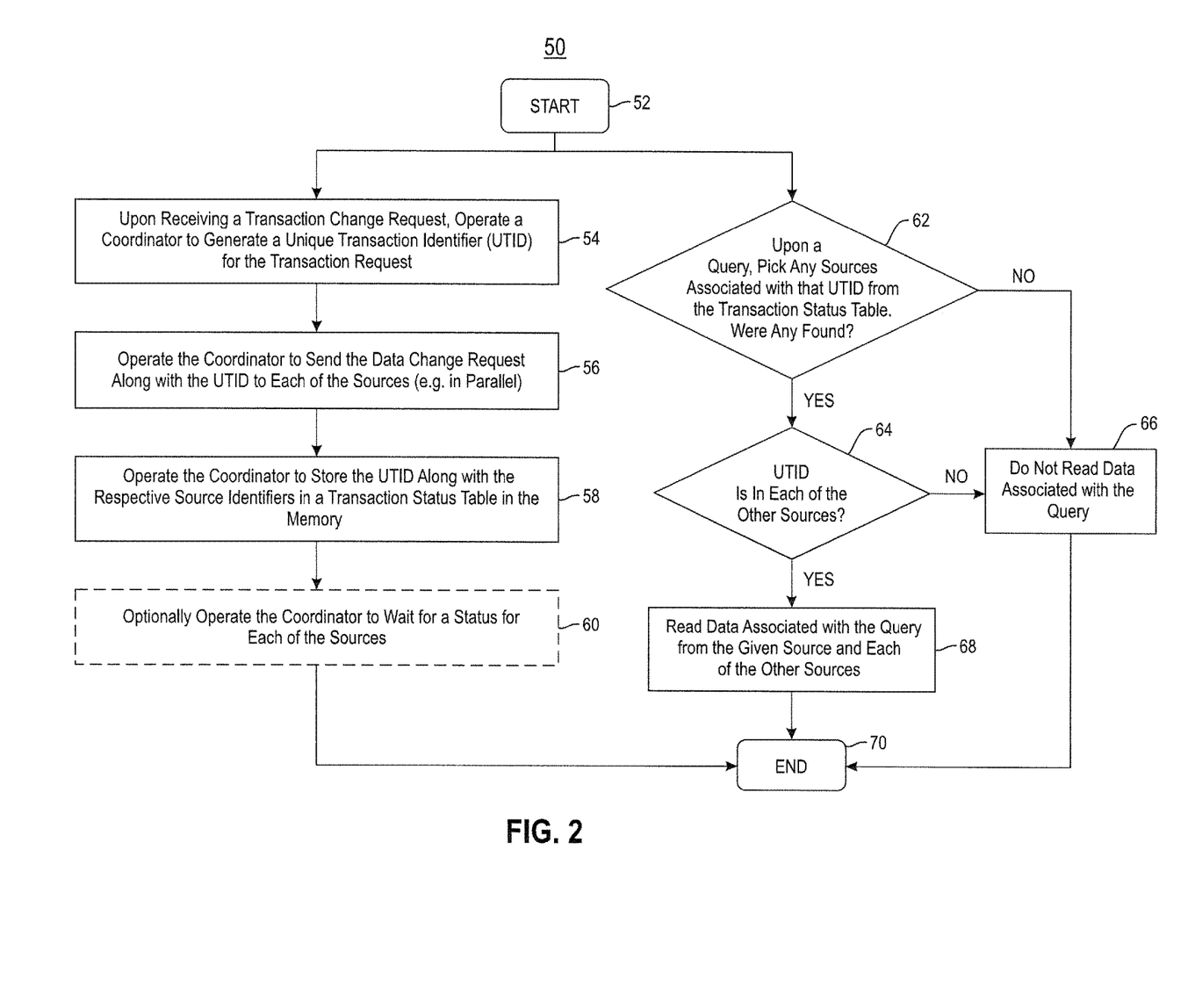
FIG. 2 is flowchart of a method of processing a transaction in accordance with an embodiment.

Referring initially to FIG. 1 and the flowchart 50 in FIG. 2, a system for processing a transaction 20 includes a processor 21 and a memory 22 coupled thereto. The memory 22 may be a shared memory, for example. Beginning at Block 52, the processor 21, upon receiving a transaction change request, operates a coordinator to generate a unique transaction identifier (UTID) for the transaction request (Block 54). The processor 21, at Block 56, sends a data change request along with the UTID to each of a plurality of sources 24a-24n each having respective source identifiers. The data change request may be sent to each of the sources 24a-24n in parallel, for example. At Block 58, the processor 21 stores the UTID along with the respective source identifiers in a transaction status table 26 in the memory 22. More particularly, for each data source 24a-24n, the source identifiers may be locally saved and the requests to perform the change with the additional of the UTID are queued. A request for recording of or storing of the UTIDs and saved source identifiers into the transaction status table is also queued. Block 56 and 58 can be performed in parallel. At Block 60, the coordinator may be operated to optionally wait for a status from each of the sources 24a-24n.

At block 62, upon receiving a query or read request validation, given sources 24a-24n may be operated to determine from the transaction status table 26 in the memory 22, any other sources associated with the UTID. More particularly, the processor 21 may collect records accessed by the query or read request from the given data sources 24a-24n. The UTID may be extracted based upon the query, for example, from a row corresponding to a match in the query. The transaction status table 26 is joined using the UTID as a join key extracting a list of source identifiers. If no other data sources 24a-24n are associated with the UTID at Block 62), the given source is operated to not read data associated with the query (Block 66).

At Block 64, upon the query, the given source 24a-24n is operated to determine whether the UTID is in each of the other sources. If the UTID is not in the other data sources 24a-24n, for example, at least one other data source, the given source is operated to not read data associated with the query (Block 66). In other words, the accessed data should be ignored.

When the UTID is in each of the data sources 24a-24n (Block 64), the data associated with the query is read from the given data source and each of the other sources (Block 68). The method ends at Block 70.

Figure 3:
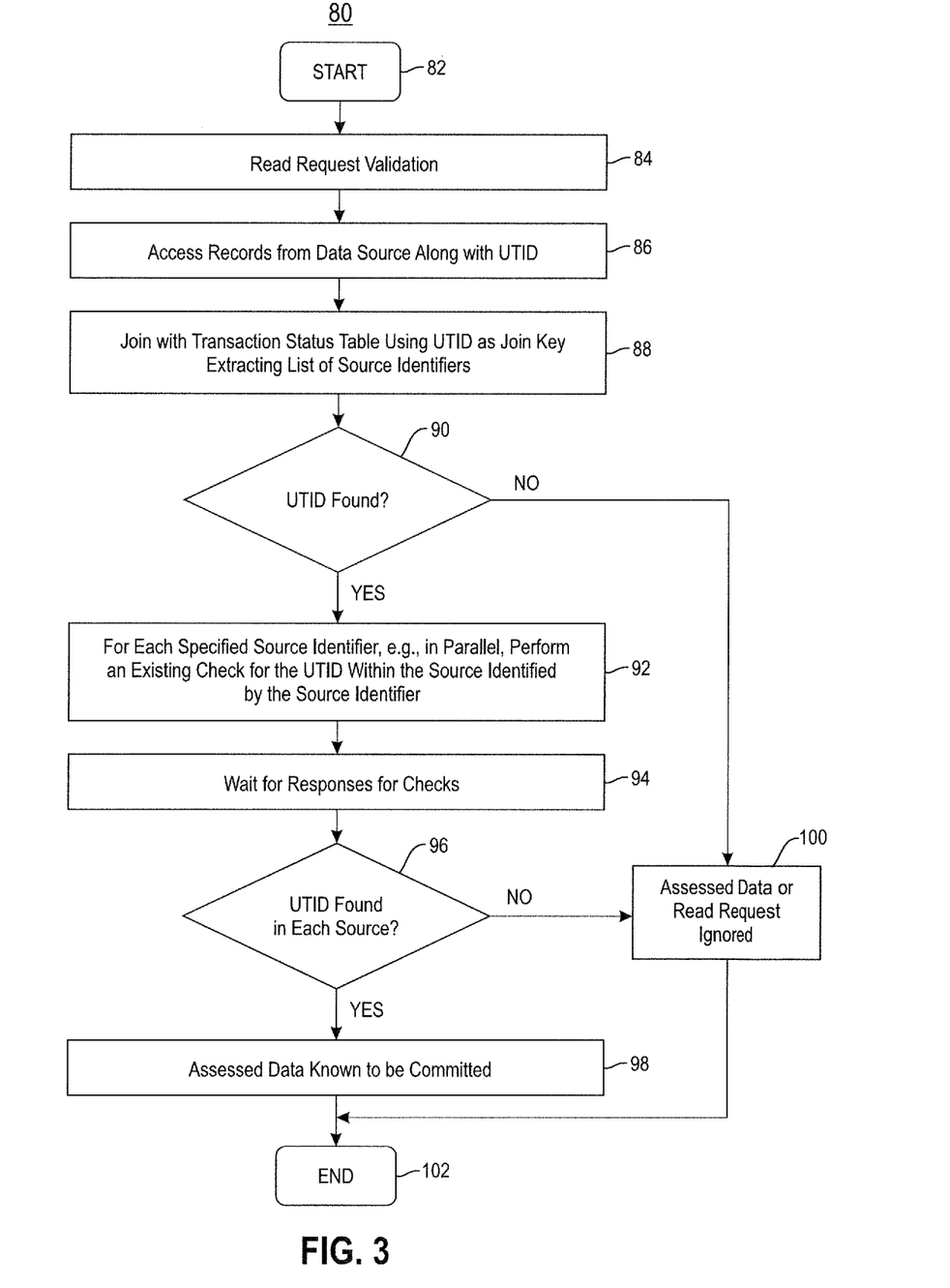
FIG. 3 is a more detailed flowchart of a portion of the method of FIG. 2.

Referring now to the flowchart 80 in FIG. 3, beginning at Block 82 further details of the query will now be described. At Block 84, the query or read request is validated. At Block 86, records from the given data source 24a-24n are accessed along with the UTID. At Block 88, the transaction status table 26 is joined using the UTID as a join key extracting a list of source identifiers. At Block 90, a determination is made as to whether the UTID was found. If the UTID was not found, the accessed data or read request is ignored (Block 100). If the UTID was found at Block 90, for each specified source identifier, an existence check for the UTID within the source identified by the source identifier may be performed, for example, in parallel (Block 92). Accordingly, all checks are queued, and at Block 94, a delay is inserted until responses, for example, from the checks or the other sources 24a-24n, are received. At Block 96, a determination is made as to whether the UTID was found in each source 24a-24n. If, at Block 96, the UTID was not found in each source 24a-24n, the accessed data or read request is ignored (Block 100). If, at Block 96, the UTID was found in each data source 24a-24n, the accessed data is known to be committed at Block 98. At the completion of a successful read where the accessed data is known to be committed, the final outcome in the transaction status table 26 may be updated from unknown to committed. This updation may also be done by background tasks that are independent of read requests, so as to reduce latency for read requests. The method ends at Block 102.

Figure 4:
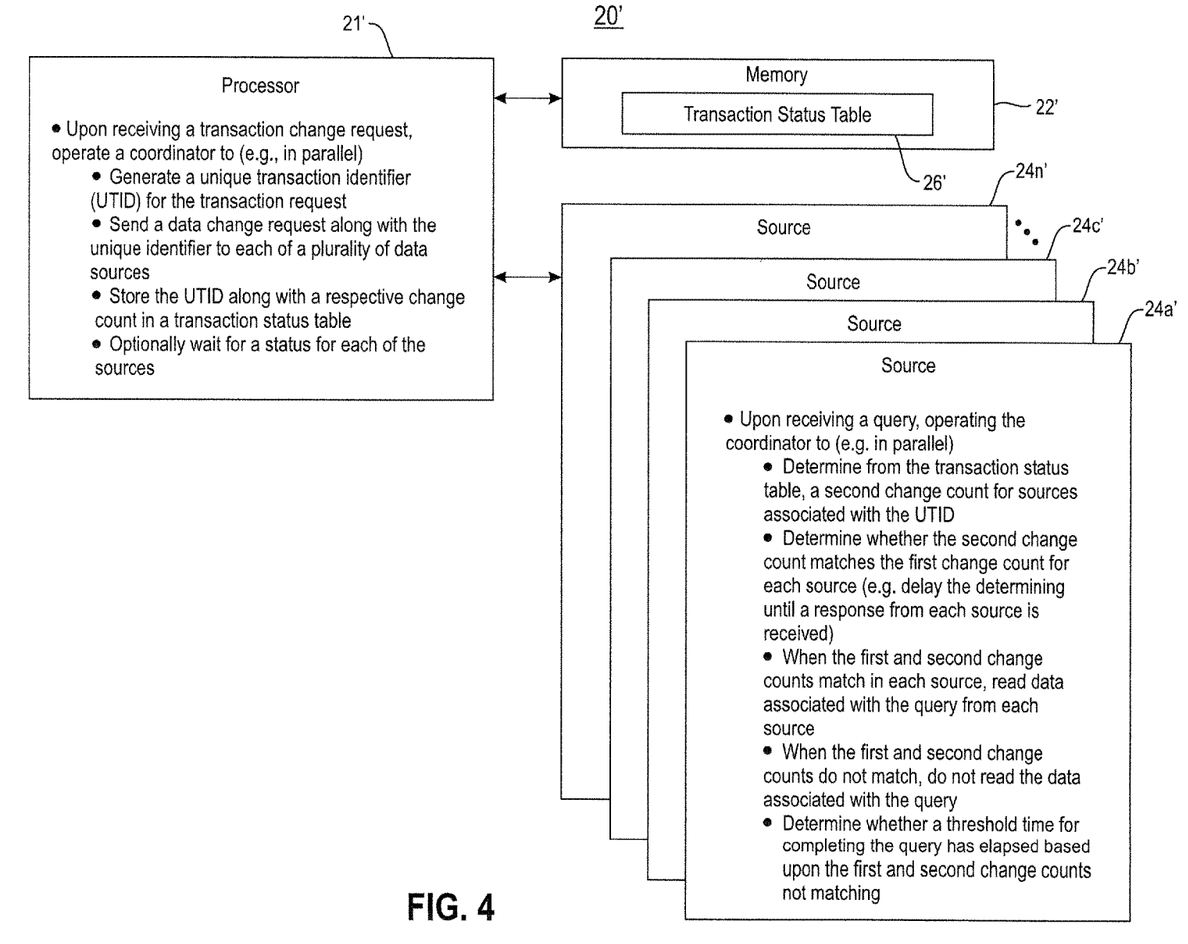
FIG. 4 is a schematic block diagram of a system in accordance with another embodiment.
Figure 5:
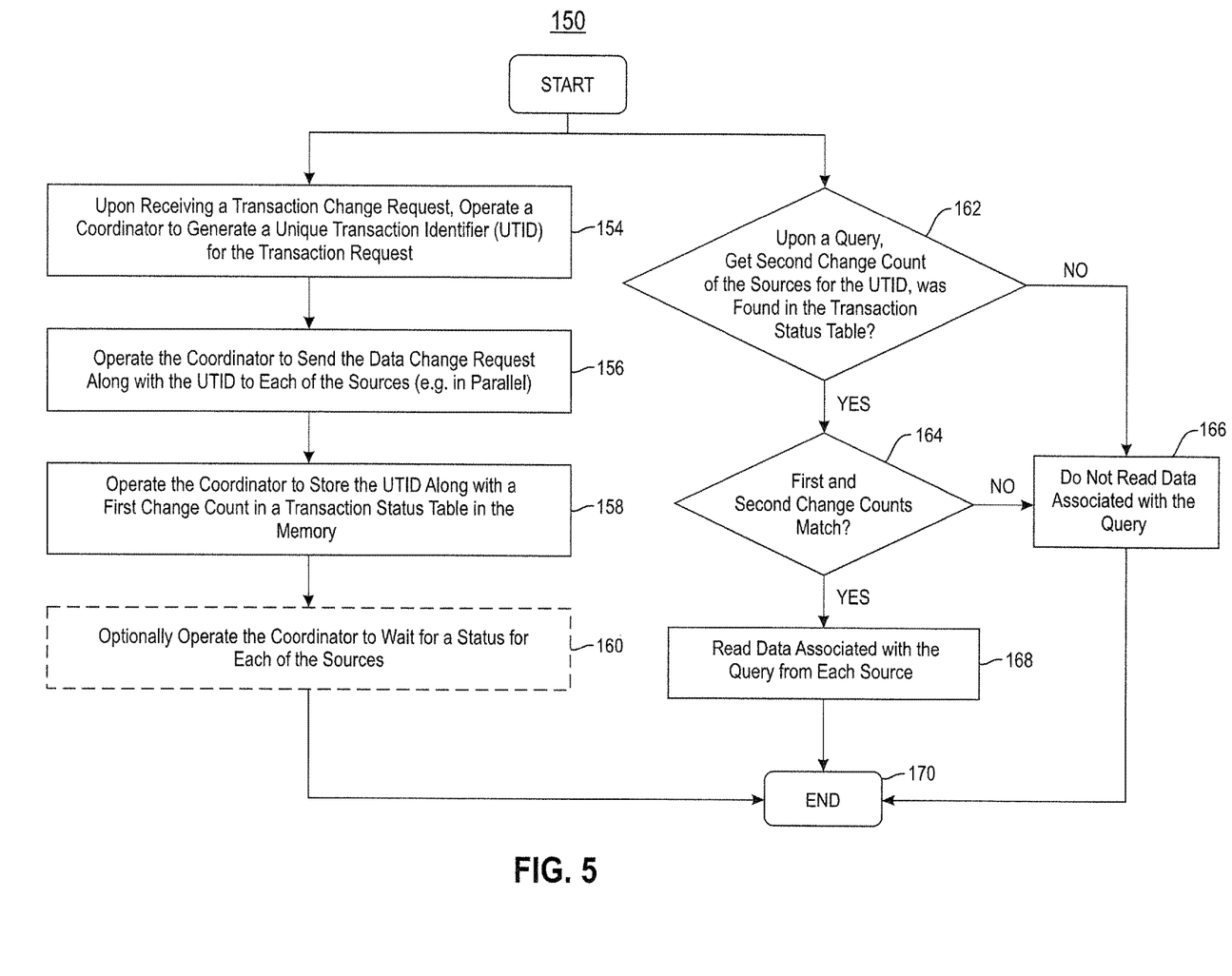
FIG. 5 is flowchart of a method of processing a transaction in accordance with an embodiment.

Referring now to FIG. 4 and the flowchart 150 in FIG. 5, a system for processing a transaction 20' includes a processor 21' and a memory 22' coupled thereto. Beginning at Block 152, the processor 21', upon receiving a transaction change request, operates a coordinator to generate a unique transaction identifier (UTID) for the transaction request (Block 154). The processor 21', at Block 156, sends a data change request along with the UTID to each of a plurality of sources 24a'-24n'. The data change request may be sent to each of the sources 24a'-24n' in parallel, for example. At Block 158, the processor 21' stores the UTID along with a respective first change count in a transaction status table 26' in the memory 22'. More particularly, for each data source 24a'-24n', changes may be locally counted, and the requests to perform the change with the addition of the UTID are queued. After all data change transaction requests have been queued in parallel, recording of or storing of the UTIDs and count of changes into the transaction status table is queued. At Block 160, the coordinator may optionally be operated to wait for a status from each of the sources 24a'-24n'.

At block 162, upon receiving a query or read request validation, sources 24a'-24n' may be operated to determine a second change count of sources associated with the UTID. The UTID may be extracted based upon the query, for example, from a row corresponding to a match in the query. The processor 21' may collect accessed records from the given data source 24a'-24n' associated with the UTID. The transaction status table 26' is joined using the UTID as a join key extracting a second change count. If the second change count cannot be determined, for example, if there are not any, the given source is operated to not read data associated with the query (Block 166).

At Block 164, upon the query, the given source 24a'-24n' is operated to determine whether the second change count for changes associated with the given UTID match the first change count for each source, which includes the given source and each of the other sources. If the first and second change counts do not match, the given source is operated to not read data associated with the query (Block 166). In other words, the accessed data should be ignored.

When the first and second change counts match, for example, for each of the data sources 24a'-24n' (Block 164), the data associated with the query is read from the given data source and each of the other sources (Block 168). The method ends at Block 170.

Figure 6:
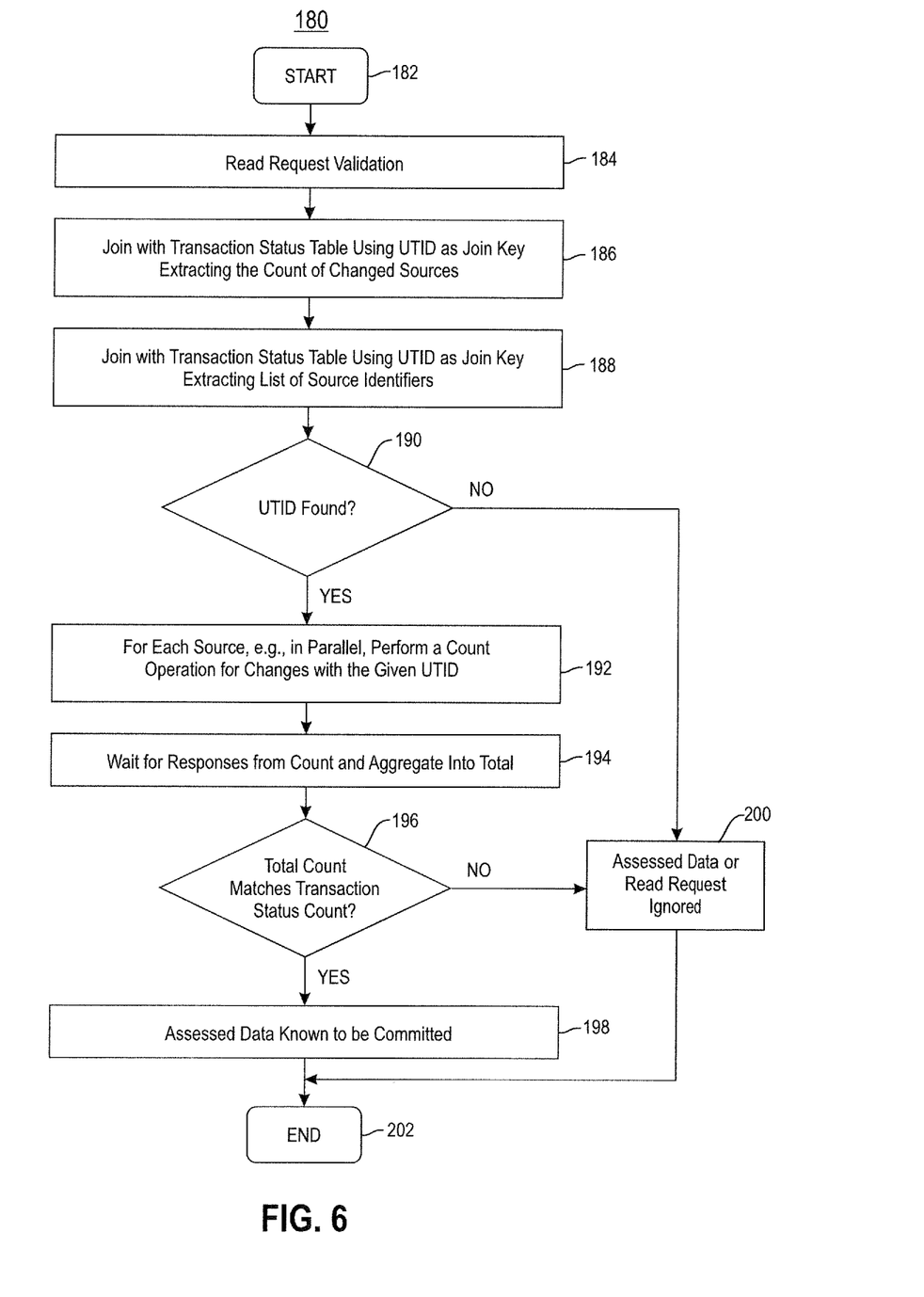
FIG. 6 is a more detailed flowchart of a portion of the method of FIG. 5.

Referring now to the flowchart 180 in FIG. 6, beginning at Block 182 further details of the query will now be described. At Block 184, the query or read request is validated. At Block 186, records from the given data source 24a'-24n' are accessed along with the UTID. At Block 188, the transaction status table 26' is joined using the UTID as a join key extracting the count of changed sources. At Block 190, a determination is made as to whether the UTID was found. If the UTID was not found, the accessed data or read request is ignored (Block 200). If the UTID was found at Block 190, for all data sources 24a'-24n', a count operation for changes within the given UTID may be performed, for example, in parallel (Block 192). Accordingly, all checks are queued, and at Block 194, a delay is inserted until responses from the counts are received and aggregated into the total. At Block 196, a determination is made as to whether the total count matches the transaction status count. If, at Block 196, the total counts does not match the transaction status count, the accessed data or read request is ignored (Block 200). If, at Block 196, the total count matches the transaction status count, the accessed data is known to be committed at Block 198. At the completion of a successful read where the accessed data is known to be committed, the final outcome in the transaction status table 26' and/or source change requests may be updated from unknown to committed. This update may also be done by background tasks that are independent of read requests, so as to reduce latency for read requests. The method ends at Block 202.

Figure 7:
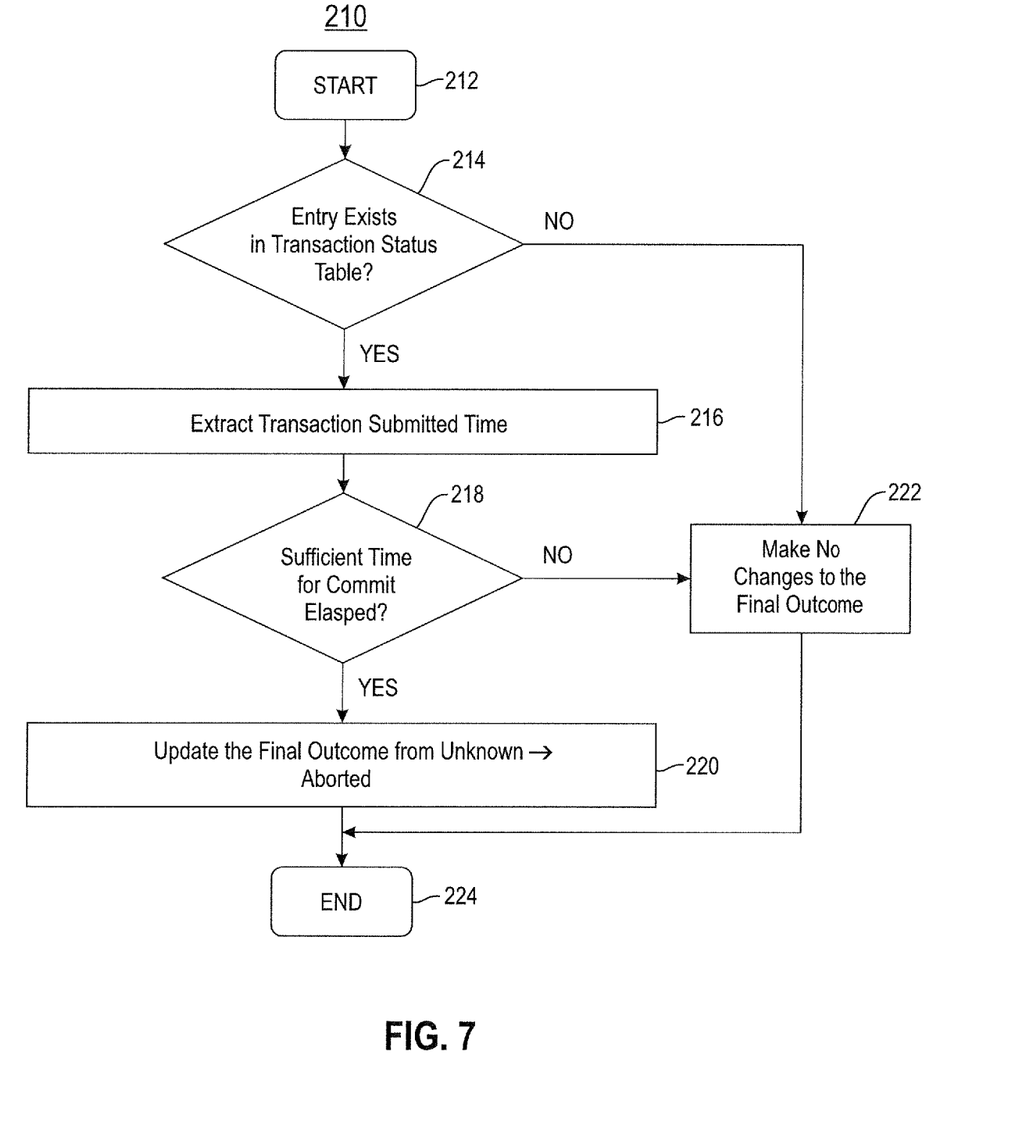
FIG. 7 is a flowchart of a query in accordance with an embodiment.

Referring now to the flowchart 210 in FIG. 7, further details of an enhanced read protocol or a query will now be described with respect to a failed read where accessed data should be ignored. Beginning at Block 212, at the completion of a failed read whereby the accessed data should be ignored (e.g., Blocks 100 and 200, above), a determination is made at Block 214 as to whether an entry exists in the transaction status table 26, 26'. If an entry does not exist (Block 214), no changes are made to the final outcome (Block 222). If an entry does exist (Block 214), the transaction submitted time is extracted at Block 216. A determination as to whether a threshold time for completing the query is made at Block 218. In other words, a determination is made as to whether sufficient time for the completion of the commit has elapsed. If sufficient time has elapsed at Block 218, the final outcome is updated in the transaction status table and/or specific source change entries 26, 26' from unknown to aborted (Block 220). If sufficient time has not elapsed at Block 218, no changes are made to the final outcome (Block 222). The process ends at Block 224.

Figure 8:
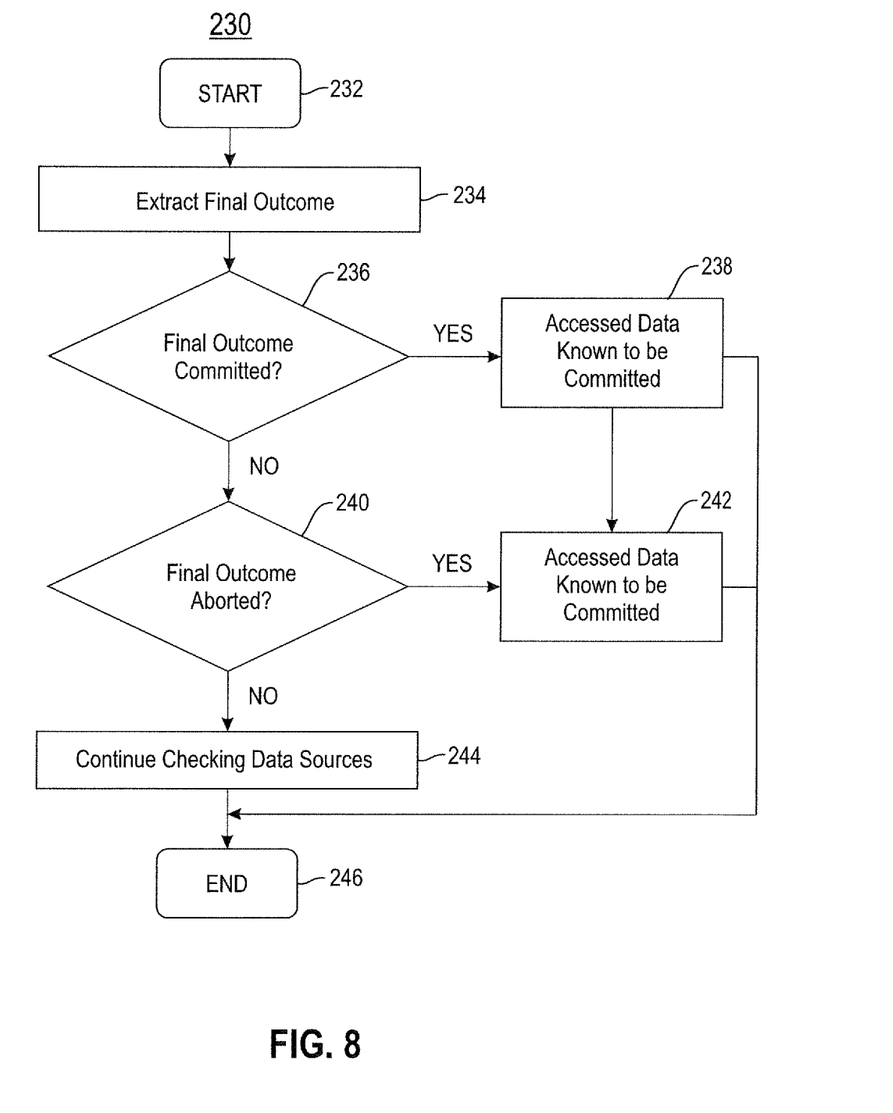
FIG. 8 is a flowchart of a query with respect to the final outcome in accordance with an embodiment.

Referring now to the flowchart 230 in FIG. 8, further details of the query with respect to the final outcome will now be described. The final outcome is extracted (Block 234) either from a recorded source change or the transaction status table after joining. If the final outcome is "committed" at Block 236, the accessed data is known to be committed (Block 238). If the final outcome is not committed at Block 236, a determination is made as to whether the final outcome is "aborted" at Block 240. If the final outcome is determined to be "aborted," the accessed data should be ignored or not read (Block 242). If the final outcome is determined to not be "aborted," the checking of data sources 24a-24n, 24a'-24n' is continued (Block 244). The process ends at Block 246.

As will be appreciated by those skilled in the art, the concepts behind the embodiments described herein includes stamping each delta produced by a multi-shard transaction with an identifier that is specific to the transaction. Another insert is then added to the transaction, more particularly, an insert to a transaction status table. This status record has the transaction identifier, as well as a summary of the list of touched or affected shards. A summary may be a count in cases where the responsible application "knows" which shards are being affected. The extra insert is performed in parallel with the regular shard inserts, and thereby no extra latency may be incurred. Each shard modification is done as a separate ACID (Atomicity, Consistency, Isolation, Durability) "sub-transaction", without two-phase operation. However, a challenge may occur with queries whereby it may be desirable that a transaction's modifications be visible only if all sub-transactions for a transaction commit. Thus, when a query sees an input shard with one or more rows (satisfying the query predicates) with such a multi-shard transaction identifier, it joins those rows with the corresponding status records in the status table, and the corresponding rows for those transactions in the other shards. With respect to online transaction processing (OLTP) queries, the joining occurs on an as-needed basis if a selected row has such identifier or marker. With respect to online analytical processing (OLAP) queries, joining is proactive for the rows marked with such identifier.

Thus, only if all the component pieces of a multi-shard transaction are present (in the join result) will the query see any of those components. A background operation performs such join periodically, i.e. accessing batches of deltas from multiple transactions, and for all the successful transactions, it replaces the transaction identifier with a 'success' flag (this is a non-undone operation), so that subsequent queries can avoid this join for such rows.

As described above, for the purposes of contrasting with a 2-phase commit protocol (2PC), the coordinator multicasts commit message (if any) to shards and the commit message to transaction status shard (any of these may be this node itself). There may be no serialization required for these messages. Commit messages to the data shards are optional—if the system uses logical rollback, the transaction identified may be stamped on each delta (eg, insert, delete or update). Each shard, upon receipt of commit message, applies any constraint checks, and then persists it local to that shard. It should be noted that this "local persistence" could involve any of writing to persistent storage (SSD, battery-backed memory, NVRAM, etc.), or writing to desired fraction of replicas, for example. The transaction is committed as soon as every replica has received, accepted, and persisted the message. Each shard then sends an acknowledgement (ACK) to the coordinator, and the coordinator informs the client at this stage that the transaction has committed. The coordinator asynchronously changes the transaction identifier on the inserted deltas to "committed".

In contrast, in a 2PC protocol, there is latency for a write operation, which includes the following steps: 1) the coordinator multicasts prepare message to shards; 2) shards harden locally; 3) shards send ACK to coordinator; 4) coordinator hardens commit locally; and 5) inform client, and then asynchronously send commit to shards.

With respect to the embodiments described herein and relative to 2PC protocols, savings are achieved on the coordinator hardening within the critical path of each write. Moreover, with respect to 2PC protocols, the coordinator is a single bottleneck.

Moreover, the transaction is committed right after hardening locally in the embodiments described herein (unlike after the coordinator hardens the commit locally as in 2PC protocols). Thus, in the embodiments described herein, even if the coordinator is "down", shards can send the ACK to a different node. Additionally, the embodiments described herein may increase processing speeds by using quorum, e.g. coordinator multicasts message to all replicas of each shard, and a receipt happens when quorum on each shard gets the message. Thus, time taken may be a maximum of the 50th percentile message latency instead of a maximum of message latency.

The system and method described herein, may also be particularly useful in heterogeneous systems. For example, the system and method may be particularly useful for transactions over multiple systems, some of which may not support ACID transactions (e.g. NoSQL systems). The system and method described herein may behave as a wrapper that provides ACID guarantees on top of NoSQL systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for processing a transaction comprising:

in response to receiving a transaction change request, operating a coordinator to generate a unique transaction identifier for the transaction change request, send a data change request along with the unique transaction identifier to each of a plurality of sources to be changed by the transaction, and store the unique transaction identifier in a transaction status table along with a respective first change count of the plurality of sources to be changed by the transaction;

in response to receiving a query, operating a given source of the plurality of sources to determine from the transaction status table a second change count of a plurality of sources that have been changed associated with the unique transaction identifier, determine whether the second change count matches the first change count for each source of the plurality of sources, and in response to the first and second change counts not matching in each source, operating the coordinator to determine that a threshold time for completing the query has elapsed and to update a final outcome of the unique transaction identifier in the transaction status table as aborted, based on the threshold time having elapsed.

2. The computer-implemented method of claim 1 wherein operating the coordinator to send the data change request with the unique transaction identifier comprises operating the coordinator to send the data change request with the unique transaction identifier to each of the plurality of sources in parallel.

3. The computer-implemented method of claim 1 further comprising operating the coordinator to wait for a status from each of the plurality of sources.

4. The computer-implemented method of claim 1 comprising, in response to receiving the query, operating the plurality of sources to delay determining whether the second change count matches the first change count until a response from each source is received.

5. A system for processing a transaction comprising: a processor and a memory coupled thereto, the processor configured to:

in response to receiving a transaction change request, operate a coordinator to generate a unique transaction identifier for the transaction request, send a data change request along with the unique transaction identifier to each of a plurality of sources to be changed by the transaction, and store the unique transaction identifier in a transaction status table in the memory along with a respective first change count of the plurality of sources to be changed by the transaction; and in response to receiving a query, operate a given source of the plurality of sources to determine from the transaction status table a second change count of a plurality of sources that have been changed associated with the unique transaction identifier, determine whether the second change count matches the first change count for each source of the plurality of sources, and in response to the first and second change counts not matching in each source, operate the coordinator to determine that a threshold time for completing the query has elapsed and to update a final outcome of the unique transaction identifier in the transaction status table as aborted, based on the threshold time having elapsed.

6. The system of claim 5 wherein sending the data change request with the unique transaction identifier comprises operating the coordinator to send the data change request with the unique transaction identifier to each of the plurality of sources in parallel.

7. The system of claim 5 wherein the processor is further configured to operate the coordinator to wait for a status from each of the plurality of sources.

8. The system of claim 5 wherein the processor is configured to, in response to receiving the query, operate the plurality of sources in parallel.

9. The system of claim 5 wherein the processor is configured to, in response to receiving the query, operate the plurality of sources to delay determining whether the second change count matches the first change count until a response from each source is received.

10. A computer-readable storage medium for processing a transaction, the computer-readable medium having computer executable for causing a processor to perform operations comprising:

in response to receiving a transaction change request, operating a coordinator to generate a unique transaction identifier for the transaction request, send a data change request along with the unique transaction identifier to each of a plurality of sources to be changed by the transaction, and store the unique transaction identifier in a transaction status table along with a respective first change count of the plurality of sources to be changed by the transaction:

in response to receiving a query, operating a given source of the plurality of sources to determine from the transaction status table a second change count of a plurality of sources that have been changed associated with the unique transaction identifier, determine whether the second change count matches the first change count for each source of the plurality of sources, and in response to the first and second change counts not matching in each source, operating the coordinator to determine that a threshold time for completing the query has elapsed and to update a final outcome of the unique transaction identifier in the transaction status table as aborted, based on the threshold time having elapsed.

11. The computer-readable storage medium of claim 10 wherein sending the data change request with the unique transaction identifier comprises operating the coordinator to send the data change request with the unique transaction identifier to each of the plurality of sources in parallel.

12. The computer-readable storage medium of claim 10 wherein the operations comprise operating the coordinator to wait for a status from each of the plurality of sources.

13. The computer-readable storage medium of claim 10 wherein the operations comprise, in response to receiving the query, operating the plurality of sources in parallel.

14. The computer-readable storage medium of claim 10 wherein the operations comprise, in response to receiving the query, operating the plurality of sources to delay determining whether the second change count matches the first change count until a response from each source is received.

15. A computer-implemented method for processing a transaction comprising:
- in response to receiving a transaction change request, operating a coordinator to generate a unique transaction identifier for the transaction change request, send a data change request along with the unique transaction identifier to each of a plurality of sources, and store the unique transaction identifier in a transaction status table along with a respective first change count of the plurality of sources to be changed by the transaction;
- in response to receiving a query, operating a given source of the plurality of sources to determine from the transaction status table a second change count of a plurality of sources that have been changed associated with the unique transaction identifier, and determine whether the second change count matches the first change count for each source of the plurality of sources; and
- in response to the first and second change counts matching in each source, operating the coordinator to update a final outcome of the transaction as committed and to replace the unique transaction identifier with a success flag in the transaction status table.

* * * * *